United States Patent [19]

Yoshida

[11] Patent Number: 4,965,536
[45] Date of Patent: Oct. 23, 1990

[54] QUADRATURE AMPLITUDE MODULATION SYSTEM USING DIGITAL FILTERS

[75] Inventor: Yasuharu Yoshida, Tokyo, Japan
[73] Assignee: NEC Corporation, Tokyo, Japan
[21] Appl. No.: 358,114
[22] Filed: May 30, 1989
[30] Foreign Application Priority Data
   May 28, 1988 [JP] Japan .................. 63-131233
[51] Int. Cl.⁵ ........................................... H04L 27/36
[52] U.S. Cl. ....................................... 332/103; 375/39
[58] Field of Search ................... 332/103, 104; 375/39
[56] References Cited
   U.S. PATENT DOCUMENTS
   4,812,786  3/1989  Davarian et al. .................... 332/103

Primary Examiner—Sigfried H. Grimm
Attorney, Agent, or Firm—Sughrue, Mion, Zinn, Macpeak & Seas

[57] ABSTRACT

A modulating device applicable to a digital radio communications system which is adaptable to a 16 or greater multi-level QAM modulation system. The device has two multi-input digital filters to implement the role of cosine roll-off filters. A logic circuit precedes the digital filters to logically manipulate n-bit data streams except for m bits (m<n) thereof which should be modulated, in a predetermined manner. The logic circuit is capable of correcting deviations of signal points of a QAM wave or changing the contour of signal constellation to a circular contour or the like, as desired.

2 Claims, 3 Drawing Sheets

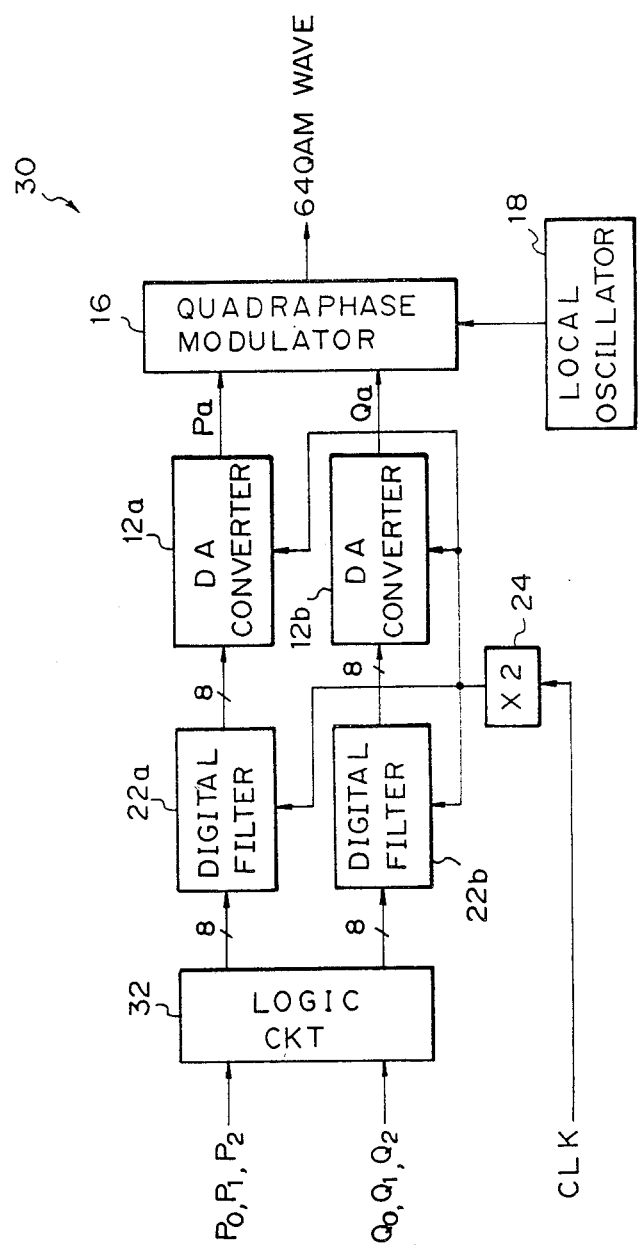

QUADRATURE AMPLITUDE MODULATION SYSTEM USING DIGITAL FILTERS

BACKGROUND OF THE INVENTION

The present invention relates to a modulating device and, more particularly, to a modulating device advantageously applicable, but not limited to, a digital radio communications system of the type adopting multi-level quadrature amplitude modulation (QAM).

A recent achievement in the realm of digital communications art is a multi-level QAM system which remarkably enhances high performance data transmission, e.g., a 16 QAM system or a 64 QAM system. In this kind of modulation system, the occupied bandwidth of a modulation signal wave is severely restricted for the purpose of, among others, promoting efficient use of the limited bandwidth. With a modulating device of the kind generating a multi-level QAM wave, it has been customary to use filters which confine the QAM signal in a desired frequency band by effecting cosine roll-off spectral shaping. Such a modulating device may be constructed to produce a 64 QAM wave from two groups of three data streams, as well known in the art. This type of device has digital-to-analog (DA) converters each translating three data streams into an 8-level signal, two filters each being associated with a respective one of the DA converters for applying cosine roll-of spectral shaping to the 8-level signal, and a quadraphase modulator for processing the filtered eight-level signals by using the output of a local oscillator so as to deliver a QAM wave (64 QAM wave) having undergone cosine roll-off spectral shaping. Each of the filters is made up of a low-pass filter for producing a cosine roll-off spectral waveform, an amplitude equalizer for transforming a non-return-to-zero (NRZ) data signal into an impulse signal, and a delay equalizer for compensating for delay distortions which are inherent in the low-pass filter and amplitude equalizer. These components as a whole are required to have a characteristic which is free from delay distortions and is substantially coincident with theoretical amplitude values. However, since the characteristic required of the filter is extremely severe, the adjustment is time- and labor-consuming. It follows that the modulating device using the filters is disproportionately large scale and expensive.

In the light of the above, the low-pass type filters may be replaced with binary transversal filters (BTFs). A BTF which is a digital signal processing implementation eliminates the need for adjustments and can be reduced in circuit scale by large-scale integration. However, BTFs each having only one-bit input cannot implement modulating devices except for a 4 PSK modulating device, i.e., applying BTFs to a 16 QAM or higher QAM modulating device is impracticable.

SUMMARY OF THE INVENTION

It is therefore an object of the present invention to provide a modulating device having a cosine roll-off spectral shaping function and, yet, readily adaptable to a 16 or greater multi-level QAM system without aggravating the circuit scale and cost.

It is another object of the present invention to provide a generally improved modulating device.

A modulating device of the present invention comprises two digital filters each for digitally processing input parallel n-bit data streams which include m (an integer equal to or smaller than n) data signals to thereby produce G (larger than m) data signal streams, two digital-to-analog converters each being associated with a respective one of the two digital filters and, in response to outputs of the associated digital filters, individually producing multi-level signals P and Q, and a quadraphase modulator for producing a quadrature amplitude modulated wave in response to the multi-level signals P and Q, the digital filters each comprising n-bit shift registers, a group of multipliers each for multiplying B (equal to or larger than m) data streams by a weighting coefficient each having A (larger than m) bits, and an adder for adding outputs of the multipliers or outputs of the shift registers to produce the G data signal streams.

BRIEF DESCRIPTION OF THE DRAWINGS

The above and other objects, features and advantages of the present invention will become more apparent from the following detailed description taken with the accompanying drawings in which:

FIG. 3 is a schematic block diagram showing an alternative embodiment of the present invention.

DESCRIPTION OF THE PREFERRED EMBODIMENTS

Figure 1:
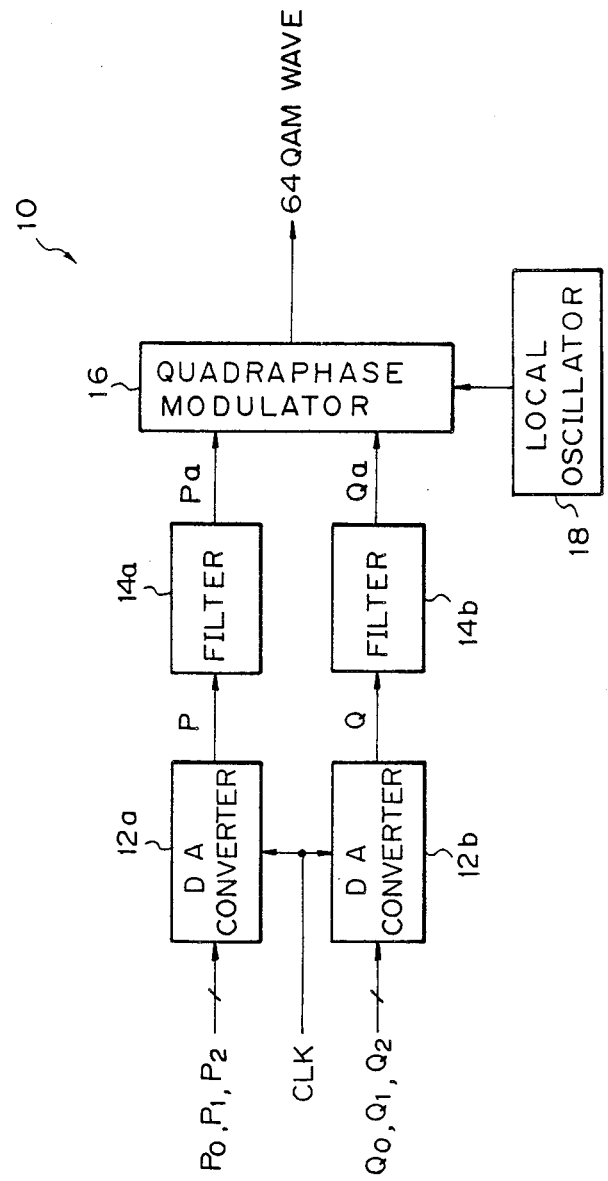
FIG. 1 is a schematic block diagram showing a prior art 64 QAM modulating device.

To better understand the present invention, a brief reference will be made to a prior art modulating device which produces a multi-level QAM wave, more particularly a modulating device of the type using filters for applying cosine roll-off spectral shaping to input data signals, shown in FIG. 1. As shown, the prior art device, generally 10, modulates two groups of input signals, i.e., three data signal streams ($P_0$, $P_1$, $P_2$) and three data signal streams ($Q_0$, $Q_1$, $Q_2$) to generate a 64 QAM wave.

Specifically, the modulating device 10 has 3-bit digital-to-analog (DA) converters 12a and 12b to which the data signal streams $P_0$, $P_1$, $P_2$ and $Q_0$, $Q_1$, $Q_2$ are respectively applied. The DA converters 12a and 12b transform the input signal streams to 8-level signals P and Q, respectively. A clock CLK is applied to the DA converters 12a and 12b. Filters 14a and 14b receive the 8-level signals P and Q, respectively, and effect cosine roll-off spectral shaping with the individual inputs to produce 8-level signals Pa and Qa. The filter outputs Pa and Qa are fed to a quadraphase modulator 16. A local oscillator 18 is connected to the quadraphase modulator 16. The quadraphase modulator 16 modulates the output of the local oscillator 18 by the 8-level signals Pa and Qa to produce a QAM wave (64 QAM wave) which has been subjected to the cosine roll-off spectral shaping process. Each of the filters 14a and 14b is made up of a low-pass filter for producing a cosine roll-off spectral waveform, an amplitude equalizer for transforming a non-return-to-zero (NRZ) data signal into an impulse signal, and a delay equalizer for compensating for delay distortions which are inherent in the low-pass filter and amplitude equalizer. While the modulating device 10 is applicable to the baseband, a modulating device operable in an IF (Intermediate Frequency) band is usually implemented by band-pass type filters for the cosine roll-off spectral shaping.

A problem with the prior art modulating device 10 is that the characteristic required of each filter 14a or 14b is set up by the combination of multiple components, resulting in the need for extremely troublesome adjustments. It follows that the modulating device 10 using the filters 14a and 14b is disproportionately large scale and expensive, as discussed earlier. This problem may be eliminated by replacing the low-pass type filters 14a and 14b with BTFs. However, as also stated previously, BTFs each having only one-bit input cannot implement modulating devices except for a 4 PSK modulating device, i.e., applying BTFs to a 16 QAM or higher QAM modulating device is impracticable.

Figure 2:
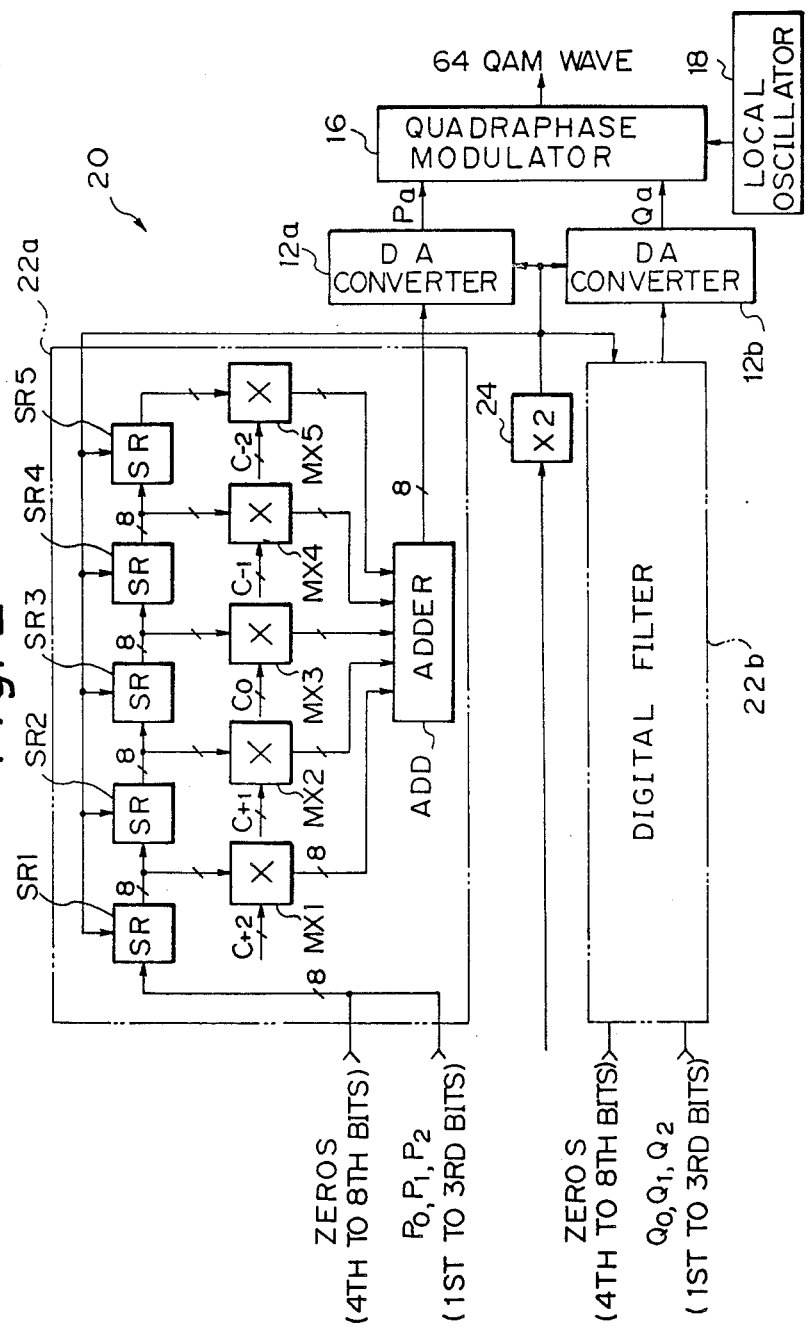
FIG. 2 is a schemtic block diagram showing a modulating device embodying the present invention.

Referring to FIG. 2 of the drawings, a modulating device embodying the present is shown and generally designated by the reference numeral 20. In the figures, similar components or structural elements are designated by the same reference numerals, and redundant description will be avoided for simplicity. As shown, the modulating device 20 is made up of digital filters 22a and 22b, DA converters 12a and 12b, a quadraphase modulator 16, a local oscillator 18, and a doubler 24. Each of the digital filters 22a and 22b has shift registers SR1 to SR5 each having one time slot being assigned thereto, multipliers MX1 to MX5, and an adder ADD. The digital filters 22a and 22b are each implemented by a commercially available digital filter having a resolution of eight bits and five taps and, therefore, capable of handling eight bits of data streams at a time. When the modulating device 20 is used with a 64 QAM system, the input data signals $P_0$, $P_1$, $P_2$ and $Q_0$, $Q_1$, $Q_2$ are respectively applied to the first to the third bits of the input terminals of the individual digital filters 22a and 22b, while a (logical) ZERO is applied to the fourth to the eight bits of the input terminals of the digital filters 22a and 22b. As the 8-bit data sequences are individually applied to the eight input terminals of the associated digital filter 22a or 22b, the shift registers SR1 to SR5 sequentially shift them on a one time slot basis. A shift clock for allowing the shift registers SR1 to SR5 to perform such operations is produced by the doubler 24 which doubles the input clock CLK. Hence, the shift registers SR1 to SR5 are operated at a doubled oversampling frequency.

The 8-bit data streams outputted by the individual shift registers SR1 to SR5 and sequentially shifted by one time slot are fed to the multipliers MX1 to MX5 which are associated with the shift registers SR1 to SR5, respectively. The multipliers MX1 to MX5 multiply the incoming parallel data by weighting coefficients $C_{+2}$, $C_{+1}$, $C_0$, $C_{-1}$ and $C_2$, respectively. The weighting coefficients $C_{+2}$ to $C_{-2}$ have fixed values which are so selected as to achieve a characteristic equivalent to the characteristic of a cosine roll-off filter. In the illustrative embodiment, each weighting coefficient has eight bits. The outputs of the multipliers MX1 to MX5 are added together by the adder ADD. As a result, an 8-bit data stream signal having undergone cosine roll-off spectral shaping appears on the output of the adder ADD, i.e., the output of the digital filter 22a or 22b. This 8-bit data stream signal is converted into an 8-bit analog signal Pa or Qa by the DA converter 12a or 12b which is operating at the frequency of 2 CLK, the analog signal being fed to the quadraphase modulator 16. Consequently, the quadraphase modulator 16 produces on its output terminal a 64 QAM wave which has been subjected to cosine roll-off spectral shaping like the conventional 64 QAM wave.

While the characteristic of the digital filters 22a and 22b depends on the weighting coefficients $C_{+2}$ to $C_{+2}$, it will become more analogous to the characteristic of a cosine roll-off filter with the increase in the number of taps. Since each of the digital filters 22a and 22b is operated at a doubled oversampling rate, its output contains an undesirable noise component whose frequency is 2 CLK. Nevertheless, if a relatively high oversampling frequency is chosen to shift the noise component to the higher frequency side, the need for an extra analog filter for removing the unnecessary component will be successfully eliminated.

With the modulating device 20, it is possible to produce even a QAM wave having a greater number of levels such as 256 levels. This is accomplished simply by applying data streams for modulation to the first to fourth bits of each of the digital filters 22a and 22b. To further enhance the performance, use may be made of digital filters each having a resolution of nine bits or ten bits.

The digital filters 22a and 22b shown and described are merely illustrative examples of commercially available digital filters and may be implemented by any other suitable kind of digital filters. For example, each digital filter may be constructed such that the input signals are directly fed to the multipliers MX1 to MX5 and the outputs of the multipliers MX1 to MX5 are added together by the adder ADD after being individually delayed by the shift registers SR1 to SR5.

In the case that the digital filters 22a and 22b are implemented as independent parts, each of the shift registers SR1 to SR5 may be constituted by a shift register of the type shifting input data by the minimum necessary number of bits, e.g., parallel three bits in the case of a 64 QAM system by one time slot.

In summary, in this particular embodiment, each of two digital filters shifts n-bit data streams in multiple steps by shift registers so that B-bit data streams outputted by the respective shifting stages and sequentially shifted by one time slot are fed to a group of multipliers. The multipliers individually multiply the input data streams by predetermined weighting coefficients each having A bits. The outputs of the multipliers are added by an adder to form G streams of data signals. The characteristic of the digital filters depends upon the weighting coefficients, and it will become more close to a desired filter characteristic as the number of multipliers is increased. The illustrative embodiment using multi-input digital filters to implement the function of cosine roll-off spectral filters as described above does not need adjustments at all and is of small size and inexpensive. Moreover, the embodiment readily accommodates even a QAM system having sixteen or more levels.

Referring to FIG. 3, an alternative embodiment of the present invention is shown. In the figure, a modulating device, generally 30, is different from the modulating device 20 in that it has a logic circuit 32 connecting to the input terminals of the digital filters 22a and 22b. While the signal points of a QAM wave are in itself expected to be distributed at equal intervals, they are apt to shift away from their normal positions when the quadraphase modulator 16 or similar component has non-linearity. The logic circuit 32 shown in FIG. 3 is successful in digitally correcting such shifts of the signal points. Assuming that the weighting coefficient $C_0$ of each of the digial filters 22a and 22b is a ONE and the others are ZEROs, the digital filter is put in a so-called through state. In this condition, the position of a signal point is measured on the basis of the output of the quadraphase modulator 16 to thereby determine a deviation thereof from a normal point, and the logic circuit 32 increases or decreases the level by an amount associated with the deviation. In a 64 QAM system, for example, three bits of parallel data are applied at a time while each digital filter 22a or 22b handles eight bits at a time. Then, for the above-stated correction, the logic circuit 32 logically manipulates a part of or all of the fourth to eighth bits of inputs applied to the digital filter 22a or 22b.

More specifically, the logic circuit 32 may be constituted by a first and a second ROM (Read Only Memory) each being loaded with correction values associated with the individual signal points and determined by measurement beforehand. The 3-bit data streams $P_0$, $P_1$, $P_2$ and $Q_0$, $Q_1$, $Q_2$ are applied to the first and second ROMs, respectively. While the resulting 8-bit output of the first ROM is fed to the digital filter 22a, the 8-bit output of the second ROM is delivered to the digital filter 22b.

The logic circuit 32 described above as correcting the positions of signal points may alternatively be used to change the signal constellation based on the same principle. While the signal constellation particular to a QAM system usually has a square configuration, it is preferable that the contour be as close to a circle as possible in order to reduce the average power to peak power ratio, as generally accepted in the art. The specific embodiment shown in FIG. 3 is capable of meeting such a demand with ease. Of course, the logic circuit or correction circuit 32 is not applicable to cosine roll-off filters which are constituted by BTFs, because it can handle only 3-bit data streams $P_0$, $P_1$, $P_2$ and $Q_0$, $Q_1$, $Q_2$.

As described above, this particular embodiment has a logic circuit which precedes two digital filters. The logic circuit logically manipulates parallel n bits except for m bits thereof in a predetermined manner. Hence, when the signal points of a QAM wave are distributed at irregular intervals due to the non-linearity of a quadraphase modulator, for example, the logical circuit serves to correct the intervals. Further, with the illustrative embodiment, it is possible to change the ordinary square contour of the signal constellation particular to a QAM wave to a circular or any other contour as desired. These capabilities of this particular embodiment mainly stems from the fact that each digital filter included in the embodiment is capable of handling n-bit (n>m) data streams. Assuming that m input data streams are the main signals, cosine roll-off spectral shaping filters implemented by a plurality of BTFs handle the main signals only and therefore cannot achieve the above-discussed capabilities:

Various modifications will become possible for those skilled in the art after receiving the teachings of the present disclosure without departing from the scope thereof.

What is claimed is:

1. A modulating device comprising:

two digital filters each for digitally processing input parallel n-bit data streams which include m (an integer equal to or smaller than n) data signals to thereby produce G (larger than m) data signal streams;

two digital-to-analog converters each being associated with a respective one of said two digital filters and, in response to outputs of said associated digital filters, individually producing multi-level signals P and Q; and a quadraphase modulator for producing a quadrature amplitude modulated wave in response to the multi-level signals P and Q;

wherein said digital filters each comprises a plurality of n-bit shift registers, each of said n-bit shift registers being operative to receive said n-bit data streams and output B-bit (equal to or larger than m) data streams; a plurality of multipliers for multiplying said B-bit data streams by a fixed weighting coefficient, each of said weighting coefficients having A (larger than m) bits and each of said multipliers being connected to an output of a respective one of said n-bit shift registers; and an adder for adding outputs of said multipliers to produce said G data signal streams.

2. A device as claimed in claim 1, further comprising a logic circuit for receiving the m input data signal streams and feeding to each of said two digital filters parallel n-bit (larger than m) data streams by applying a predetermined logical manipulation to parallel n bits of the input data signal streams.

* * * * *